(12) United States Patent  
Chang

(10) Patent No.: US 7,991,015 B2  
(45) Date of Patent: Aug. 2, 2011

(54) LINE TERMINAL FOR DETERMINING OPERATIONAL STATUS OF A U INTERFACE

(75) Inventor: Kai-Yen Chang, Taipei Hsien (TW)

(73) Assignee: Hon Hai Preciasion Industry Co., Ltd., Tu-Cheng, New Taipei (TW)

( * ) Notice: Subject to any disclaimer, the term of this patent is extended or adjusted under 35 U.S.C. 154(b) by 345 days.

(21) Appl. No.: 12/187,399

(22) Filed: Aug. 7, 2008

(65) Prior Publication Data

US 2009/0059963 A1    Mar. 5, 2009

(30) Foreign Application Priority Data

Aug. 28, 2007   (CN) .......................... 2007 1 0201504

(51) Int. Cl.  
*H04J 1/16* (2006.01)  
*H04M 1/24* (2006.01)

(52) U.S. Cl. ...................... 370/503; 370/241; 379/27.01

(58) Field of Classification Search .................. 370/241, 370/242, 248, 503, 507, 509–513, 463; 379/27.01–27.04, 23, 27, 30, 32, 32.04, 379/34, 399; 375/224, 227, 354–359, 365–367  
See application file for complete search history.

(56) References Cited

U.S. PATENT DOCUMENTS

| | | | | |
|---|---|---|---|---|
| 5,099,497 A | * | 3/1992 | Ohno et al. | 375/293 |
| 5,101,401 A | * | 3/1992 | Suzuki et al. | 370/241 |
| 5,577,115 A | * | 11/1996 | Deutsch et al. | 379/413.02 |
| 5,636,202 A | * | 6/1997 | Garney | 370/241 |
| 6,181,748 B1 | * | 1/2001 | Lin et al. | 375/257 |
| 6,301,340 B1 | * | 10/2001 | Sansom et al. | 379/93.06 |
| 6,320,940 B1 | * | 11/2001 | Oi | 379/27.01 |
| 2004/0004976 A1 | * | 1/2004 | Zhang et al. | 370/503 |

* cited by examiner

*Primary Examiner* — Aung S Moe  
*Assistant Examiner* — Prince Mensah  
(74) *Attorney, Agent, or Firm* — Frank R. Niranjan

(57) ABSTRACT

A line terminal for determining operational status of a U interface includes a time presetting module, a current detecting module, a cycle selecting module, a timer, and a synchronization determining module. The time presetting module is for presetting a plurality of time cycles. The current detecting module is for detecting a loop current flowing via the U interface. The cycle selecting module is for selecting a time cycle from the plurality of time cycles. The timer is for timing during the time cycle. The synchronization determining module is for determining if a line terminal has been synchronized with a digital service unit. The operational status of U interface is determined to be working normally when the line terminal has been synchronized with the digital service unit. A method for determining the operational status of U interfaces is also provided.

12 Claims, 3 Drawing Sheets

LINE TERMINAL FOR DETERMINING OPERATIONAL STATUS OF A U INTERFACE

BACKGROUND

1. Field of the Invention

Embodiments of the present disclosure relate to line terminals and, more particularly, to a line terminal and method for determining operational status of a U interface.

2. Description of Related Art

A user terminal is usually connected between an exchange terminal and a digital service unit through a line terminal in an integrated service digital network (ISDN). The user terminal and the digital service unit may be both disposed in a room, and communicate with each other via a U interface.

A working status of the user terminal depends on a communication status between the digital service unit and the line terminal, and a communication status between the digital service unit and the line terminal depends on a working status of the U interface connected between the line terminal and the exchange terminal. Thus, the working status of the U interface determines the working status of the user terminal. Generally, many factors, such as a synchronous time between the line terminal and the digital service unit, a loop polarity of the U interface, and an abnormality of the digital service unit, may affect the working status of the U interface. Therefore, it is very important to determine if the U interface works normally or abnormally in order to maintain operation of the ISDN.

SUMMARY

A line terminal for determining operational status of a U interface connecting a line terminal to a digital service unit including: a time presetting module configured for presetting a plurality of time cycles for the line terminal; a current detecting module configured for detecting a loop current flowing via the U interface; a cycle selecting module configured for selecting a first time cycle from the plurality of time cycles upon the condition that the loop current is detected by the current detecting module; a timer configured for time tracking in a first time cycle selected from the plurality of time cycles by the cycle selecting module, wherein the current detecting module is further configured for determining if the loop current is continuously detected flowing via the U interface before the timer times out in the first time cycle; a synchronization determining module configured for determining if the line terminal has been synchronized with the digital service unit upon the condition that the loop current has been continuously detected flowing via the U interface and before the timer times out in the first time cycle; and a timing determining module configured for determining if all time cycles from the plurality of time cycles have been selected by the cycle selecting module upon the condition that the line terminal has not been synchronized with the digital service unit before the timer times out in the first time cycle, and further configured for selecting a second time cycle from a remainder of the plurality of time cycles if not all the time cycles from the plurality of time cycles have been selected by the cycle selecting module, wherein the operational status of U interface is determined to be working normally upon the condition that the line terminal has been synchronized with the digital service unit before the timer times out.

Other advantages and novel features of the present invention will be drawn from the following detailed description, in which:

DETAILED DESCRIPTION OF CERTAIN INVENTIVE EMBODIMENTS

As used herein, the term "U interface" defines an interface used to connect a pair of wires from the telephone company to network terminator 1 (NT1).

Figure 1:
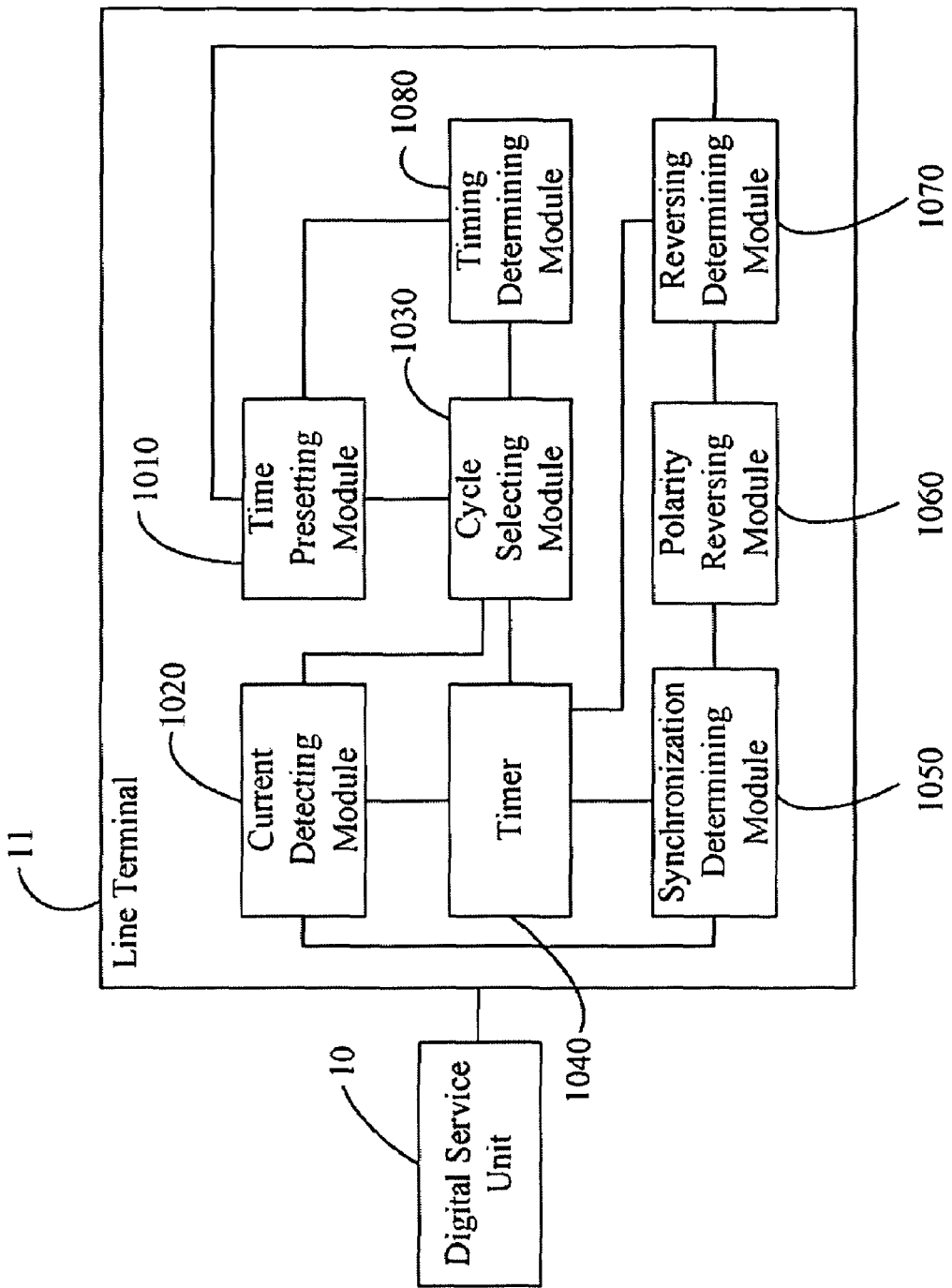
FIG. 1 is a schematic diagram of one embodiment of an application environment and functional modules of a line terminal of the present disclosure.

FIG. 1 is a schematic diagram of one embodiment of an application environment and functional modules of a line terminal 11 of the present disclosure. The line terminal 11 may be used to determine operational status of a U interface. In the embodiment of FIG. 1, a digital service unit 10 communicates with the line terminal 11 via the U interface.

The line terminal 11 includes a time presetting module 1010, a current detecting module 1020, a cycle selecting module 1030, a timer 1040, a synchronization determining module 1050, and a timing determining module 1080.

The time presetting module 1010 is configured for presetting a plurality of time cycles for the line terminal 11. As used herein, a time cycle may be a period of time. In one embodiment, the plurality of time cycles may increase progressively.

The current detecting module 1020 is configured for detecting a loop current flowing via the U interface. As used herein, loop current is an amount of electrical energy flowing via the U interface. The line terminal 11 is ready to work if the loop current is detected flowing via the U interface. In one embodiment, the current detecting module 1020 may periodically detect if a loop current is flowing via the U interface so as to determine if the line terminal 11 is ready to work. If a loop current is detected by the current detecting module 1020, then the current detecting module 1020 may cease to detect a loop current flowing via the U interface in one embodiment. In another embodiment, the current detecting module 1020 may await a message from an outer circuit indicating an existence of a loop current.

The cycle selecting module 1030 is configured for selecting one time cycle from the plurality of time cycles when the loop current is detected by the current detecting module 1020.

The timer 1040 is configured for time tracking after one time cycle has been selected by the cycle selecting module 1030. In one embodiment, the timer 1040 may start timing during a selected time cycle. The timer 1040 may time out after a period of time has passed according to the selected time cycle.

The current detecting module 1020 is further configured for determining if the loop current flowing via the U interface is continuously detected before the timer 1040 times out in the selected time cycle. The current detecting module 1020 re-detects the loop current flowing via the U interface when the loop current flowing via the U interface is not continuously detected before the timer 1040 times out.

The synchronization determining module 1050 is configured for determining if the line terminal 11 has been synchronized with the digital service unit 10 if the loop current flowing via the U interface is continuously detected before the timer 1040 times out. In one embodiment, synchronization between the line terminal 11 and the digital service unit 10 includes frames synchronization between the line terminal 11 and the digital service unit 10. In one embodiment, the synchronization determining module 1050 may periodically detect the synchronization until the line terminal 11 has been synchronized with the digital service unit 10. In another embodiment, the synchronization determining module 1050 may await a message from an outer circuit indicating the synchronization between the line terminal 11 and the digital service unit 10.

The timing determining module 1080 is configured for determining if all the time cycles have been selected when the line terminal 11 has not been synchronized with the digital service unit 10 before the timer 1040 times out.

The timing determining module 1080 is further configured for selecting another time cycle from the remainder of the plurality of time cycles when the timing determining module 1080 determines that not all the time cycles have been selected.

In one embodiment, the U interface is determined to be working normally if the synchronization determining module 1050 determines that the line terminal 11 has been synchronized with the digital service unit 10 before the timer 1040 times out.

In one embodiment, the U interface is determined to be working abnormally if all the time cycles have been selected before the line terminal 11 is synchronized with the digital service unit 10. In one embodiment, the U interface may be determined to be working abnormally if the U interface has a false loop polarity. In this embodiment, the loop polarity of the U interface may need to be reversed.

The line terminal 11 further includes a polarity reversing module 1060 configured for reversing the loop polarity of the U interface. As discussed above, the loop polarity of the U interface may need to be reversed if the synchronization determining module 1050 determines that the line terminal 11 has not been synchronized with the digital service unit 10 before the timer 1040 times out.

The timing determining module 1080 is further configured for determining if all the time cycles have been selected after the polarity reversing module 1060 reverses the loop polarity of the U interface. In one embodiment, the number of time cycles is the maximum allowable number of reversals of the U interface. The digital service unit 10 may cause the U interface to work abnormally if the loop polarity of the U interface has been reversed and the line terminal 11 has still not been synchronized with the digital service unit 10. Therefore, the line terminal 11 shows that the digital service unit 10 may need to be maintained.

The line terminal 11 further includes a reversal determining module 1070 configured for determining if the loop polarity has been reversed for a first time in the currently selected time cycle after the polarity reversing module 1060 reverses the loop polarity of the U interface.

The timing determining module 1080 is further configured for determining if all the time cycles have been selected if the reversal determining module 1070 determines that the loop polarity has been reversed not at first time in the currently selected time cycle. The timer 1040 is further configured for restarting the time tracking during the currently selected time cycle when the reversal determining module 1070 determines that the loop polarity has been reversed at first time in the currently selected time cycle. In one embodiment, the number of time cycles is two times the maximum allowable number of reversals of the U interface.

Figure 2:
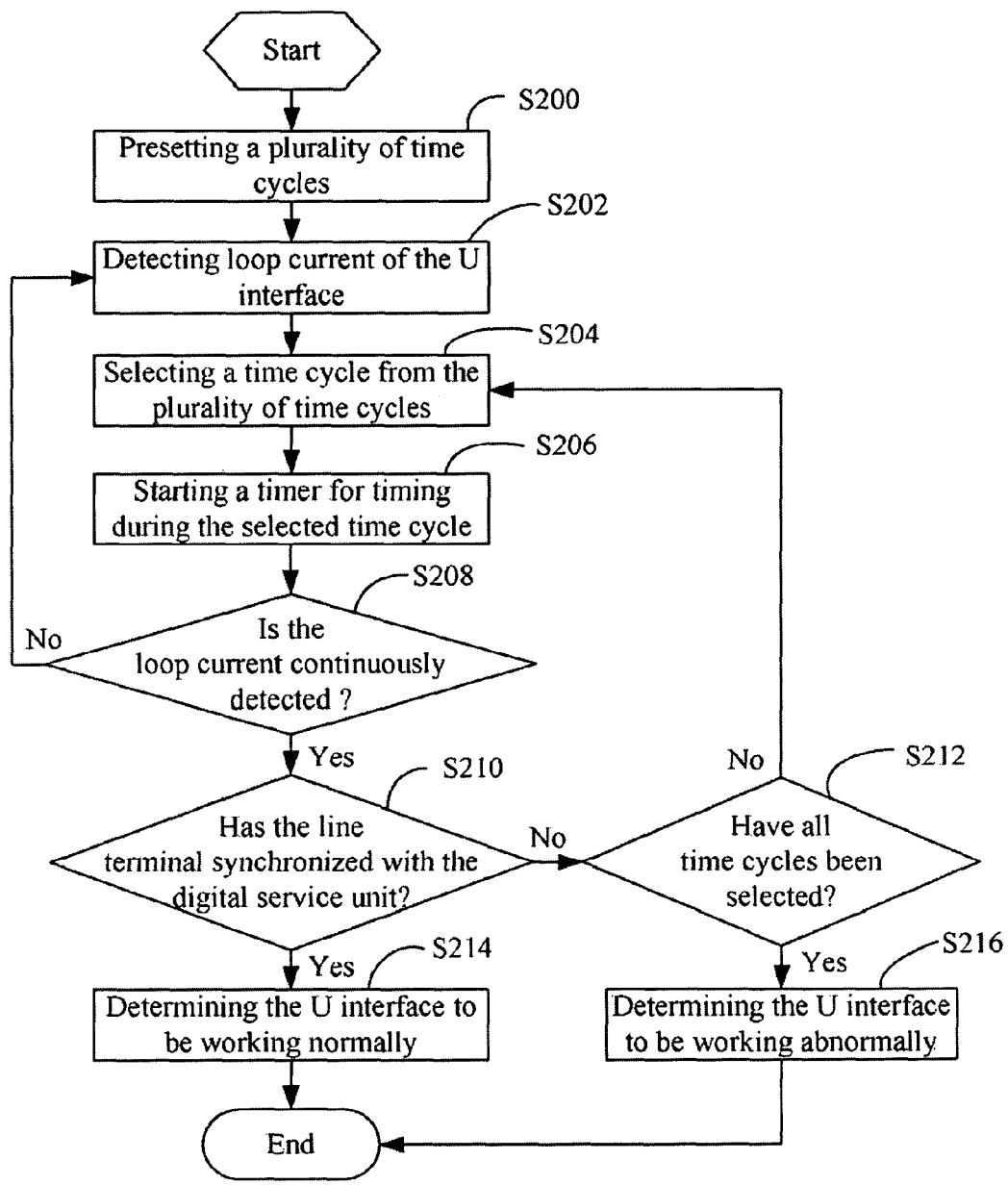
FIG. 2 is a flowchart of one embodiment of a method for determining operational status of a U interface in accordance with the present disclosure.

FIG. 2 is a flowchart of one embodiment of a method for determining operational status of a U interface in accordance with the present disclosure. In the embodiment, the method for determining the operational status of U interfaces is done by the function modules depicted in FIG. 1. It may be understood that additional blocks may be added, others removed, and ordering of the blocks may be changed depending on the embodiment.

In block S200, the time presetting module 1010 presets a plurality of time cycles for the line terminal 11. As used herein, a time cycle may be a period of time. In one embodiment, the plurality of time cycles may increase progressively. It may be understood that block S200 is not required to be executed every time the line terminal 11 starts working. The time cycles can be preset when the line terminal 11 is manufactured or when the line terminal 11 is configured for the first time.

In block S202, the current detecting module 1020 detects a loop current flowing via the U interface. The line terminal 11 is ready to work when the loop current is detected flowing via the U interface.

In block S204, the cycle selecting module 1030 selects a time cycle from the plurality of time cycles if the loop current is detected by the current detecting module 1020.

In block S206, the timer 1040 starts to track time after the time cycle has been selected by the cycle selecting module 1030. In one embodiment, the timer 1040 may start timing during the selected time cycle. The timer 1040 may time out after a period of time has passed according to the selected time cycle.

In block S208, the current detecting module 1020 determines if the loop current flowing via the U interface has been continuously detected before the timer 1040 times out in the selected time cycle. If the loop current flowing via the U interface has not been continuously detected before the timer 1040 times out, then, in block S202, the current detecting module 1020 re-detects the loop current flowing via the U interface.

In block S210, the synchronization determining module 1050 determines if the line terminal 11 has been synchronized with the digital service unit 10 if the loop current flowing via the U interface is continuously detected before the timer 1040 times out. In one embodiment, synchronization between the line terminal 11 and the digital service unit 10 includes frames synchronization between the line terminal 11 and the digital service unit 10.

In block S214, the line terminal 11 determines the U interface to be working normally if the synchronization determining module 1050 determines that the line terminal 11 has been synchronized with the digital service unit 10 and before the timer 1040 times out.

In block S212, the timing determining module 1080 determines if all the time cycles have been selected when the line terminal 11 has not been synchronized with the digital service unit 10 before the timer 1040 times out.

If the timing determining module 1080 determines that not all the time cycles have been selected, then, in block S204, the timing determining module 1080 selects another time cycle from the remainder of the plurality of time cycles.

If the timing determining module 1080 determines that all the time cycles have been selected and the line terminal 11 has not been synchronized with the digital service unit 10, then, in block S216, the U interface is determined to be working abnormally. The U interface may be determined to be working abnormally by the U interface exhibiting a false loop polarity. Therefore, the loop polarity of the U interface may need to be reversed.

Figure 3:
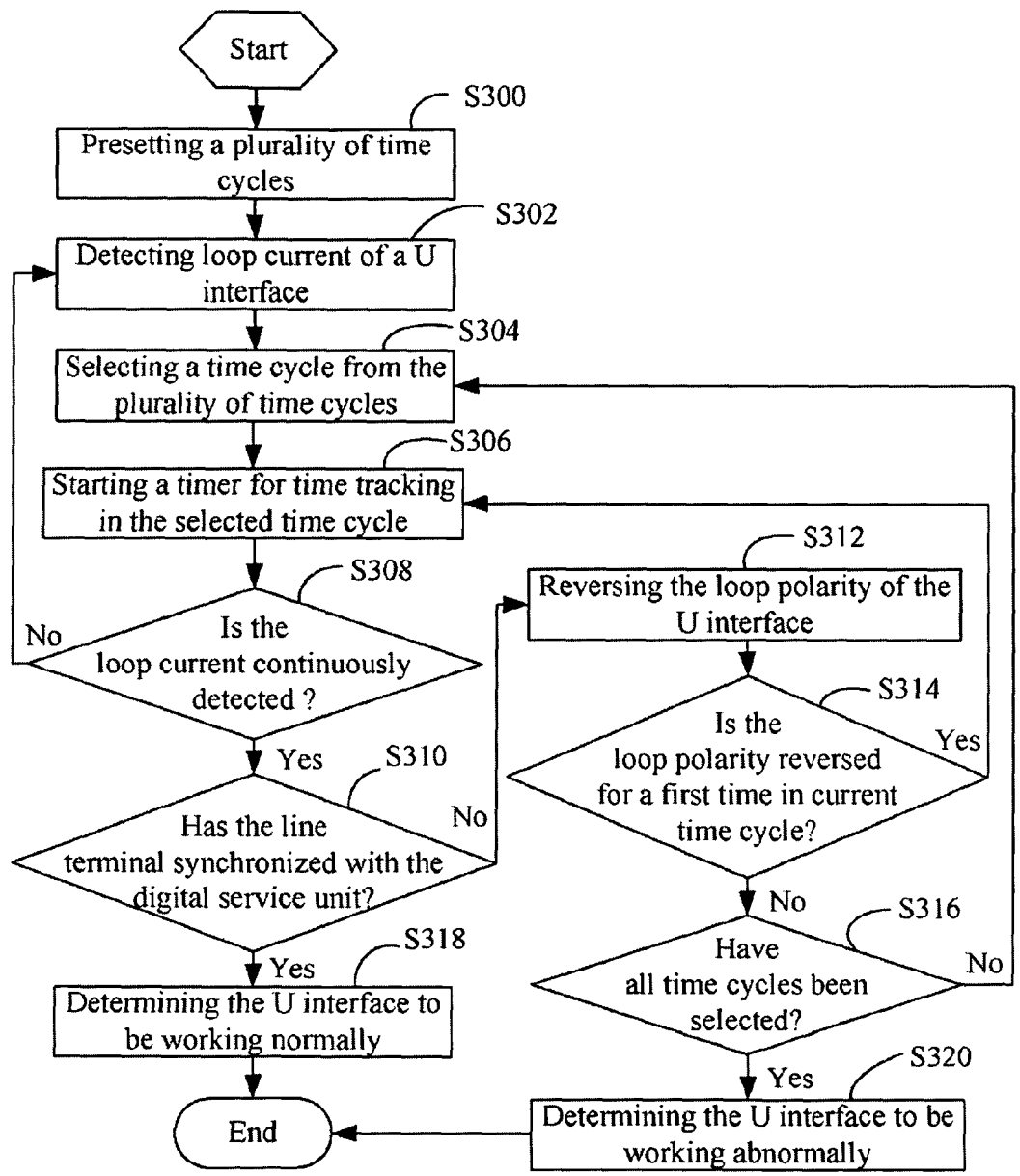
FIG. 3 is a flowchart of another embodiment of a method for determining operational status of a U interface in accordance with the present disclosure.

FIG. 3 is a flowchart of another embodiment of a method for determining operational status of a U interface in accordance with the present disclosure. It may be understood that additional blocks may be added, others removed, and ordering of the blocks may be changed depending on the embodiment.

In block S300, the time presetting module 1010 presets a plurality of time cycles.

The operations from block S302 through block S310 may be substantially the same as those from block S202 through block S210, respectively. Therefore the detailed descriptions of block S302 through block S310 have been bypassed.

If the synchronization determining module 1050 determines that the line terminal 11 has been synchronized with the digital service unit 10 before the timer 1040 times out, then, in block S318, the U interface is determined to be operating normally.

If the synchronization determining module 1050 determines that the line terminal 11 has not been synchronized with the digital service unit 10 before the timer 1040 times out, then, in block S312, the polarity reversing module 1060 reverses the loop polarity of the U interface.

In block S314, the reversal determining module 1070 determines if the loop polarity is reversed at first time in the currently selected time cycle.

If the reversal determining module 1070 determines the loop polarity is reversed at first time in the currently selected time cycle, then, in the block S306, the timer 1040 is restarted for time tracking during the currently selected time cycle.

If the reversal determining module 1070 determines the loop polarity is reversed not at first time in the currently selected time cycle, then, in block S316, the timing determining module 1080 determines if all the time cycles have been selected. In one embodiment, the number of time cycles is two times the maximum number of allowable reversal of the U interface.

In one embodiment of the present disclosure, block S316 can also be completed after block S312. That is, the timing determining module 1080 determines if all the time cycles have been selected after the polarity reversing module 1060 reverses the loop polarity of the U interface. In one embodiment, the number of time cycles is the maximum allowable number of reversals of the U interface.

If the timing determining module 1080 determines not all the time cycles have been selected, then, in block S304, the timing determining module 1080 selects another time cycle from the remainder of the plurality of time cycles.

If the timing determining module 1080 determines all the time cycles have been selected, then, in block S320, the U interface is determined to be working abnormally. In the embodiment, the digital service unit 10 may cause the U interface to be working abnormally if the loop polarity of the U interface has been reversed and the line terminal 11 has still not been synchronized with the digital service unit 10. Therefore, the line terminal 11 shows that the digital service unit 10 may need to be maintained.

The line terminal 11 determines if a U interface connecting the line terminal 11 to the digital service unit 10 works normally by presetting a plurality of time cycles. In addition, the line terminal 11 waits for synchronization between the line terminal 11 and the digital service unit 10 during every time cycle of the plurality of time cycles circularly. Furthermore, the line terminal 11 reverses the loop polarity of the U interface when the loop polarity is wrong. Therefore, the line terminal 11 of the present disclosure can settle the problem of non-synchronization between the line terminal 11 and the digital service unit 10 and prevent the U interface from working abnormally.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A line terminal for determining operational status of a U interface connecting the line terminal to a digital service unit, the line terminal comprising:
    a time presetting module configured for presetting a plurality of time cycles for the line terminal, wherein the time cycles increase progressively;
    a current detecting module configured for detecting a loop current flowing via the U interface;
    a cycle selecting module configured for selecting a first time cycle from the plurality of time cycles upon the condition that the loop current is detected by the current detecting module;
    a timer configured for time tracking in a first time cycle selected from the plurality of time cycles by the cycle selecting module, wherein the current detecting module is further configured for determining if the loop current is continuously detected flowing via the U interface before the timer times out in the first time cycle;
    a synchronization determining module configured for determining if the line terminal has been synchronized with the digital service unit upon the condition that the loop current has been continuously detected flowing via the U interface and before the timer times out in the first time cycle;
    a timing determining module configured for determining if all time cycles from the plurality of time cycles have been selected by the cycle selecting module upon the condition that the line terminal has not been synchronized with the digital service unit before the timer times out in the first time cycle, and further configured for selecting a second time cycle from a remainder of the plurality of time cycles if not all the time cycles from the plurality of time cycles have been selected by the cycle selecting module, wherein the operational status of U interface is determined to be working normally upon the condition that the line terminal has been synchronized with the digital service unit before the timer times out or to be working abnormally upon the condition that all the time cycles have been selected from the plurality of time cycles and the line terminal has not been synchronized with the digital service unit; and
    at least one processor to execute the time presetting module, the current detecting module, the cycle selecting module, the timer, the synchronization determining module, and the timing determining module.

2. The line terminal as claimed in claim 1, wherein the synchronization between the line terminal and the digital service unit comprises frames synchronization between the line terminal and the digital service unit.

3. The line terminal as claimed in claim 2, further comprising a polarity reversing module configured for reversing a loop polarity of the U interface upon the condition that the synchronization determining module determines that the line terminal has not been synchronized with the digital service unit before the timer times out in a selected time cycle.

4. The line terminal as claimed in claim 3, wherein the timing determining module is configured for determining if all the time cycles from the plurality of time cycles have been selected by the cycle selecting module after the polarity reversing module reverses the loop polarity of the U interface.

5. The line terminal as claimed in claim 4, wherein the operational status of the U interface is determined to be working abnormally upon the condition that the loop polarity of the U interface has been reversed and the line terminal has not been synchronized with the digital service unit.

6. The line terminal as claimed in claim 5, further comprising a reversal determining module configured for determining if the loop polarity of the U interface has not been reversed for a first time in a currently selected time cycle from the plurality of time cycles selected by the cycle selecting module.

7. The line terminal as claimed in claim 6, wherein the timing determining module is further configured for determining if all time cycles from the plurality of time cycles have been selected by the cycle selecting module upon the condition that the reversal determining module determines that the loop polarity of the U interface has been reversed for the first time in the currently selected time cycle.

8. The line terminal as claimed in claim 7, wherein the timer is further configured for restarting the time tracking during the currently selected time cycle upon the condition that the reversal determining module determines that the loop polarity has been reversed for the first time in the currently selected time cycle.

9. The line terminal as claimed in claim 8, wherein the U interface working abnormally is caused by a false loop polarity of the U interface.

10. A computer-implemented method for determining operational status of a U interface connecting a line terminal to a digital service unit, the method comprising:
(a) presetting a plurality of time cycles for the line terminal, wherein the time cycles increase progressively;
(b) detecting a loop current flowing via the U interface;
(c) selecting a time cycle from the plurality of time cycles upon the condition that the loop current is detected flowing via the U interface;
(d) starting a timer configured for time tracking in the time cycle selected from the plurality of time cycles;
(e) determining if the loop current has been continuously detected flowing via the U interface before the timer times out;
(f) determining if the line terminal has been synchronized with the digital service unit upon the condition that the loop current has been continuously detected flowing via the U interface before the timer times out;
(g) determining the U interface to be working normally upon the condition that the line terminal has been synchronized with the digital service unit before the timer times out;
(h) determining if all the time cycles have been selected upon the condition that the line terminal has not been synchronized with the digital service unit;
(i) selecting a next time cycle from plurality of time cycles upon the condition that not all the time cycles have been selected and repeating block (d) to block (i); and
(j) determining the U interface to be working abnormally if all the time cycles have been selected and the line terminal has not been synchronized with the digital service unit.

11. The method as claimed in claim 10, wherein block (f) further comprises:
reversing a loop polarity of the U interface upon the condition that the line terminal has not been synchronized with the digital service unit before the timer times out.

12. The method as claimed in claim 11, further comprising:
determining if the loop polarity of the U interface has been reversed for a first time in a currently selected time cycle;
restarting the timer for time tracking during the currently selected time cycle upon the condition that the loop polarity of the U interface has been reversed for the first time in the currently selected time cycle; and
following block (h) if the loop polarity of the U interface has been reversed for the first time in the currently selected time cycle.

* * * * *